United States Patent [19]
Cichowicz et al.

[11] Patent Number: 5,537,901
[45] Date of Patent: Jul. 23, 1996

[54] APPARATUS FOR MAKING FINE ADJUSTMENTS TO A ROTARY ADJUSTER

[75] Inventors: Curt S. Cichowicz; David T. Hoge, both of Westminster; Joseph J. Paone, Louisville, all of Colo.

[73] Assignee: Storage Technology Corporation, Louisville, Colo.

[21] Appl. No.: 374,156

[22] Filed: Jan. 18, 1995

[51] Int. Cl.⁶ ................................................. B25B 11/00
[52] U.S. Cl. ...................................... 81/484; 81/57.3
[58] Field of Search ................. 81/484, 488, 57.28–57.3

[56] References Cited

U.S. PATENT DOCUMENTS 3,392,608  7/1968  Schanen et al. .................. 81/57.3 X
4,043,228  8/1977  Venezio ................................ 81/57.3
4,178,816  12/1979  Radice ................................. 81/57.3
4,735,119  4/1988  Riley ................................... 81/57.3

*Primary Examiner*—James G. Smith
*Attorney, Agent, or Firm*—Sterne, Kessler, Goldstein & Fox

[57] ABSTRACT

An apparatus for making minute adjustments to a rotary adjuster, such as head alignment of a helical scan device, includes reduction means for receiving an angular displacement and transmitting a reduced angular displacement to an adjustment tool. The adjustment tool is inserted into the top of a rotary adjuster of the helical scan device. The reduction means allows for a complete turn of the knob to produce a minute adjustment to the helical scan device. The adjustment apparatus may be mounted to the helical scan device.

12 Claims, 7 Drawing Sheets

APPARATUS FOR MAKING FINE ADJUSTMENTS TO A ROTARY ADJUSTER

BACKGROUND OF THE INVENTION

1. Field of the Invention

The present invention relates to an apparatus for making fine adjustments to a rotary adjuster. In particular, the apparatus is used for adjusting head alignment of a helical scan device.

2. Related Art

Adjusting the record head of a helical scan device is a tedious, time consuming, and difficult task, even for a trained technician. Head adjustments in the microns are required and are performed by manually turning a small set screw on a helical scan drum less than one degree. This type of precise adjustment requires a concentrated and focused effort on the part of the technician which leads to worker fatigue. It is also a very costly procedure due to the time required to obtain the precise adjustment.

In addition, a certain amount of guesswork involved in the prior art has led to inconsistencies in the quality of the resulting helical scan device. The prior art consists of an allen wrench with a large knob mounted on top. The technician inserts this wrench into a helical scan device and rotates the knob to make the fine adjustment. However, a small slip of the technician's hand can result in an inaccurate adjustment.

SUMMARY OF THE INVENTION

The present invention allows minute adjustments to be made to a rotary adjuster such as the screw which adjusts the head alignment of a helical scan device. The invention allows the adjustment to be performed quickly and with less effort. With the present invention, a user is able to make a minute adjustment (e.g., on the order of 1 micron) by turning a knob a much larger amount (e.g., one full rotation). The apparatus of the invention includes a frame, a knob, a reduction means, and an adjustment tool. In the preferred embodiment, the reduction means is a gear train. A user can simply turn the knob attached to one end of the gear train. The force applied by the user produces an angular displacement. The gear train, mounted on the frame of the adjustment apparatus, receives the angular displacement and transmits a reduced angular displacement to the adjustment tool.

In the preferred embodiment, the adjustment tool is an allen wrench. The allen wrench is inserted into the top of a rotary adjuster (e.g., an allen head screw) of a record head of the helical scan device. A relatively large turn of the knob (e.g., one rotation) produces a minute adjustment (e.g., one micron) in the rotary adjuster via the reduction ratio of the gear train. The adjustment apparatus is preferably mounted to the helical scan device to prevent undesired relative movement between the adjustment tool and the screw being adjusted.

Preferred embodiments of the present invention are now described with reference to the figures where like reference numbers indicate identical or functionally similar elements. Also in the figures, the left most digit of each reference number corresponds to the figure in which the reference number is first used. While specific steps, configurations and arrangements are discussed, it should be understood that this is done for illustrative purposes only. A person skilled in the relevant art will recognize that other steps, configurations and arrangements can be used without departing from the spirit and scope of the invention.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

Figure 1:
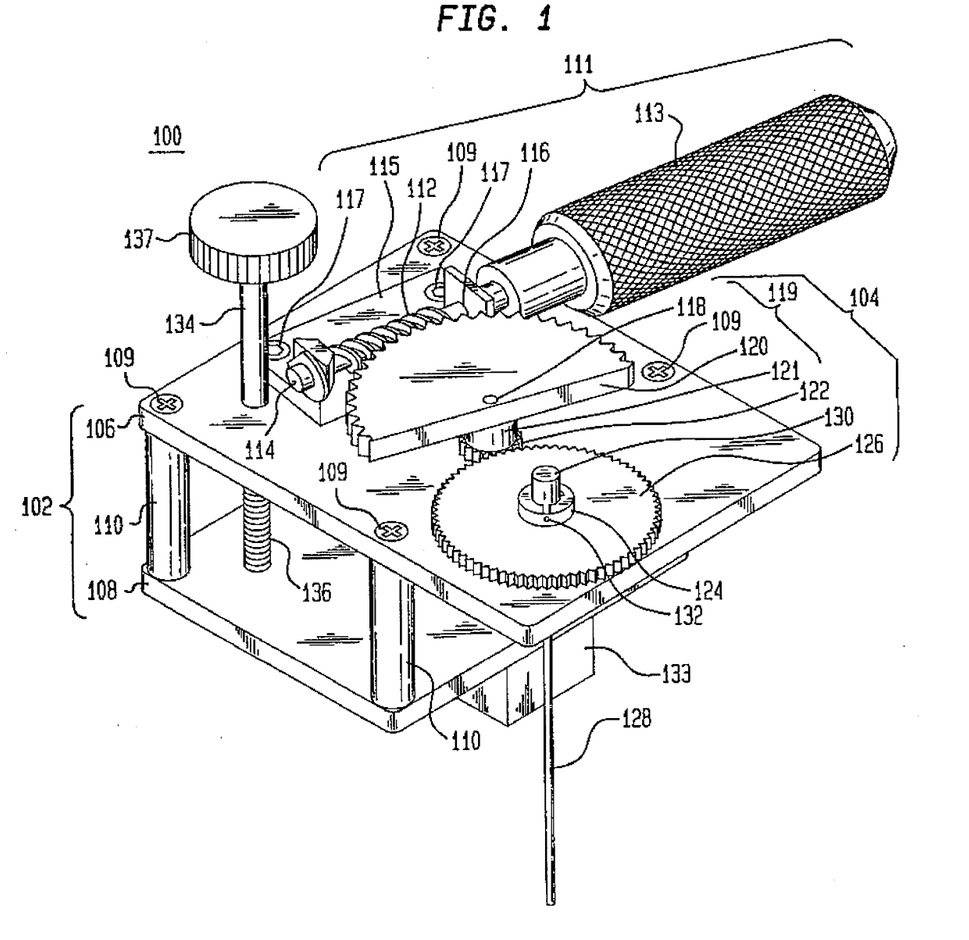
FIG. 1 is a perspective view of an adjustment apparatus.
Figure 2:
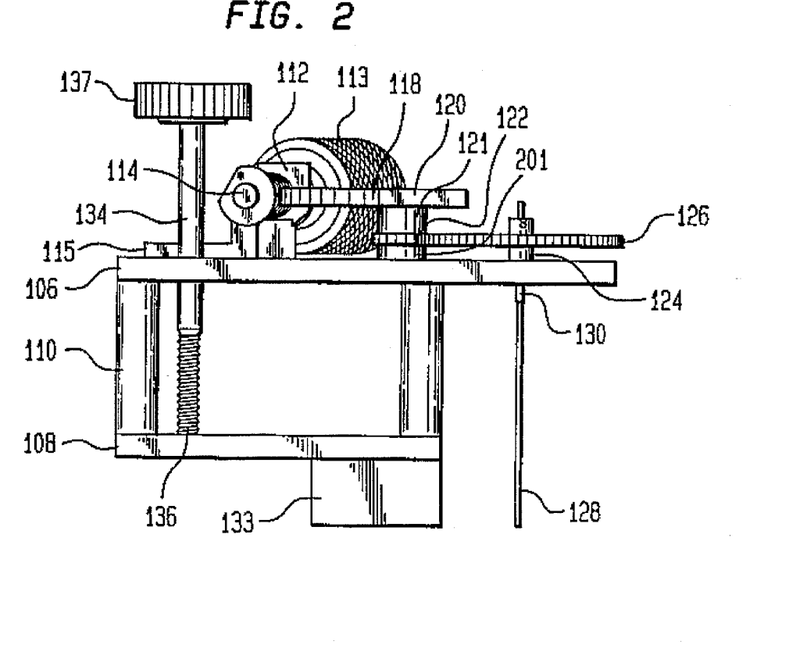
FIG. 2 is a side view of the adjustment apparatus.
Figure 3:
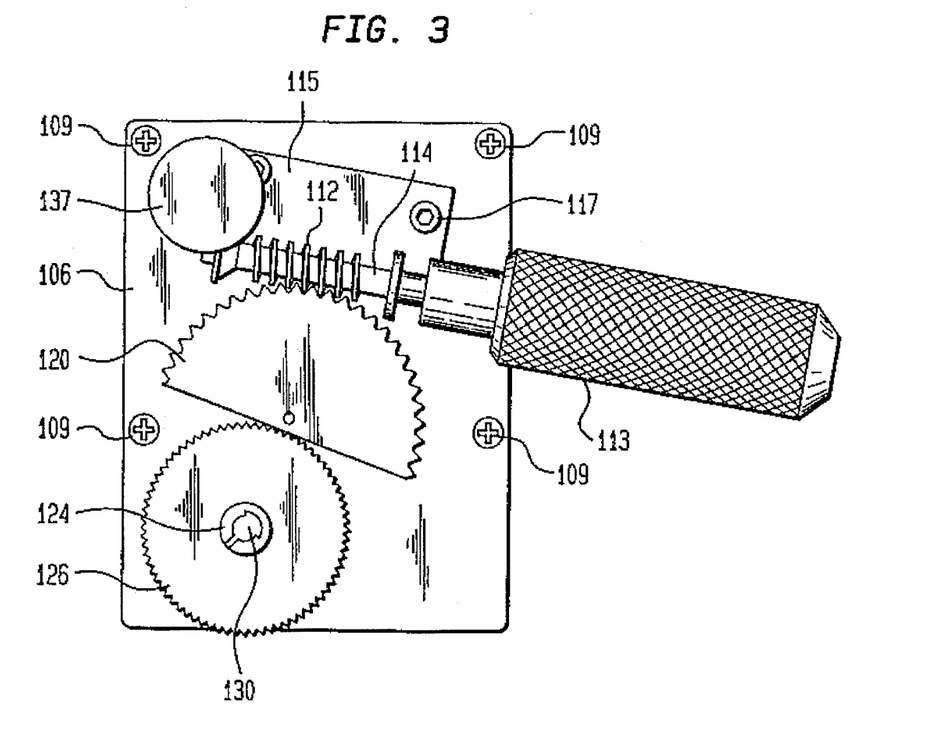
FIG. 3 is a top view of the adjustment apparatus.

FIGS. 1, 2 and 3 are a perspective view, side view and top view of an adjustment apparatus 100, respectively. Referring now to FIGS. 1–3, adjustment apparatus 100 is comprised of a frame 102 and a gear train 104. Frame 102 includes a base plate 106, a mounting plate 108, screws 109 and supports 110. Each support 110 includes threaded openings (not shown) on both ends. Base plate 106 and mounting plate 108 each have four corresponding holes (not shown). Screws 109 are inserted through the corresponding holes on base plate 106 and mounting plate 108 and into the threaded opening on each end of supports 110. Frame 102 is formed by screwing base plate 106, mounting plate 108 and supports 110 together.

Gear train 104 is mounted on base plate 106. In the preferred embodiment, gear train 104 includes a worm drive assembly 111. Worm drive assembly 111 includes a worm 112, an adjustment handle or knob 113, a support shaft 114 and a support block 115. Support shaft 114 extends from the center of knob 113. Support block 115 includes side holes 116 and screws 117. Support shaft 114 is slidably located inside side holes 116 of support block 115 and is fixedly positioned through the center of worm 112. Thus, when a user manually turns knob 113, support shaft 114 and thus worm 112 rotate together. Support block 115 is attached to base plate 106 via screws 117.

Gear train 104 also includes a shaft 118 which lies perpendicular to frame 102 and is press fit into base plate 106. In the preferred embodiment, a compound gear assembly 119 is slip fit onto shaft 118. Compound gear assembly 119 includes a half worm gear 120, a coupler 121 and a first spur gear 122. Half worm gear 120 meshes with worm 112. Coupler 121 couples half worm gear 120 and first spur gear 122 so that both gears rotate together. Shaft 118 has a shoulder area 201 (as shown in FIG. 2). First spur gear 122 rests on shoulder area 201. Shaft 118 has a groove (not shown). Once compound gear assembly 119 is fit onto shaft 118, a C-clip (not shown) is fit into the groove to secure compound gear assembly 119 onto shaft 118.

A second spur gear 126 is driven by first spur gear 122. Second spur gear 126 is fixedly mounted around a sleeve 124. In the preferred embodiment, sleeve 124 is press fit into an inside diameter 401 of roller bearing 402 (shown in FIG. 4) in base plate 106. An outside diameter 403 of roller bearing 402 is press fit into base plate 106 (shown in FIG. 4). An allen wrench 128 with a handle 130 is disposed within sleeve 124. Handle 130 of allen wrench 128 is secured in sleeve 124 by means of a set screw 132. The height of allen wrench 128 can be adjusted by releasing set screw 132.

In the preferred embodiment, a user manually turns knob 113 which produces a rotary force. This rotary force displaces worm 112 producing an angular displacement. This angular displacement is then reduced, in the preferred embodiment, through gear train 104 by a reduction ratio of 360 to 1. The resulting reduced angular displacement is then transmitted through allen wrench 128 to adjust the head alignment of a helical scan device 500. Thus, in the preferred embodiment, one rotation of knob 113 results in one degree of rotation of allen wrench 128, which equals an adjustment in the height of the record head of helical scan device 500 of approximately one micron.

In the preferred embodiment, frame 102 and supports 110 are made from aluminum. Worm 112 is made from bronze. Half worm gear 120 and second spur gear 126 are made from an engineering plastic, such as acetal. First spur gear 122 is made from brass, and shaft 118 is made from steel.

Figure 4:
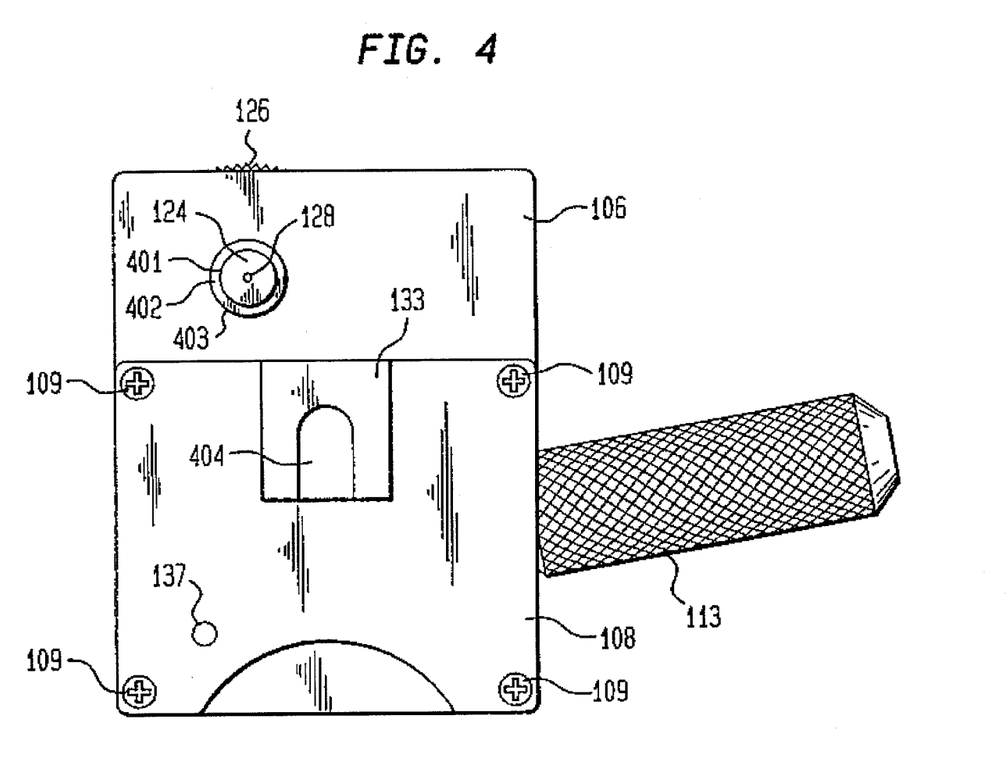
FIG. 4 is a bottom view of the adjustment apparatus.

FIG. 4 is a bottom view of adjustment apparatus 100. Referring now to FIGS. 1, 2, 4 and 5, a mounting bracket 133 is secured to mounting plate 108. In the preferred embodiment, adjustment apparatus 100 is used to make a fine adjustment to the alignment of the record head of helical scan device 500. Mounting bracket 133 is used to align adjustment apparatus 100 with an adjustment screw 506 at a desired location. Examples of a magnetic tape transport having a helical scan device are disclosed in commonly owned U.S. Pat. No. 5,333,810 and also in commonly owned, co-pending U.S. patent application No. 08/060,653, which are incorporated herein by reference. The magnetic tape transport described therein includes a read/write head and a tape transport mechanism with a threader cam surface. The inventors discovered that this threader cam surface is a preferable location on which to mount adjustment apparatus 100. By fixing the relative position of adjustment apparatus 100 to helical scan device 500, undesired movement of adjustment apparatus 100 is avoided and more precise and minute adjustments can be made to adjustment screw 506.

Figure 5:
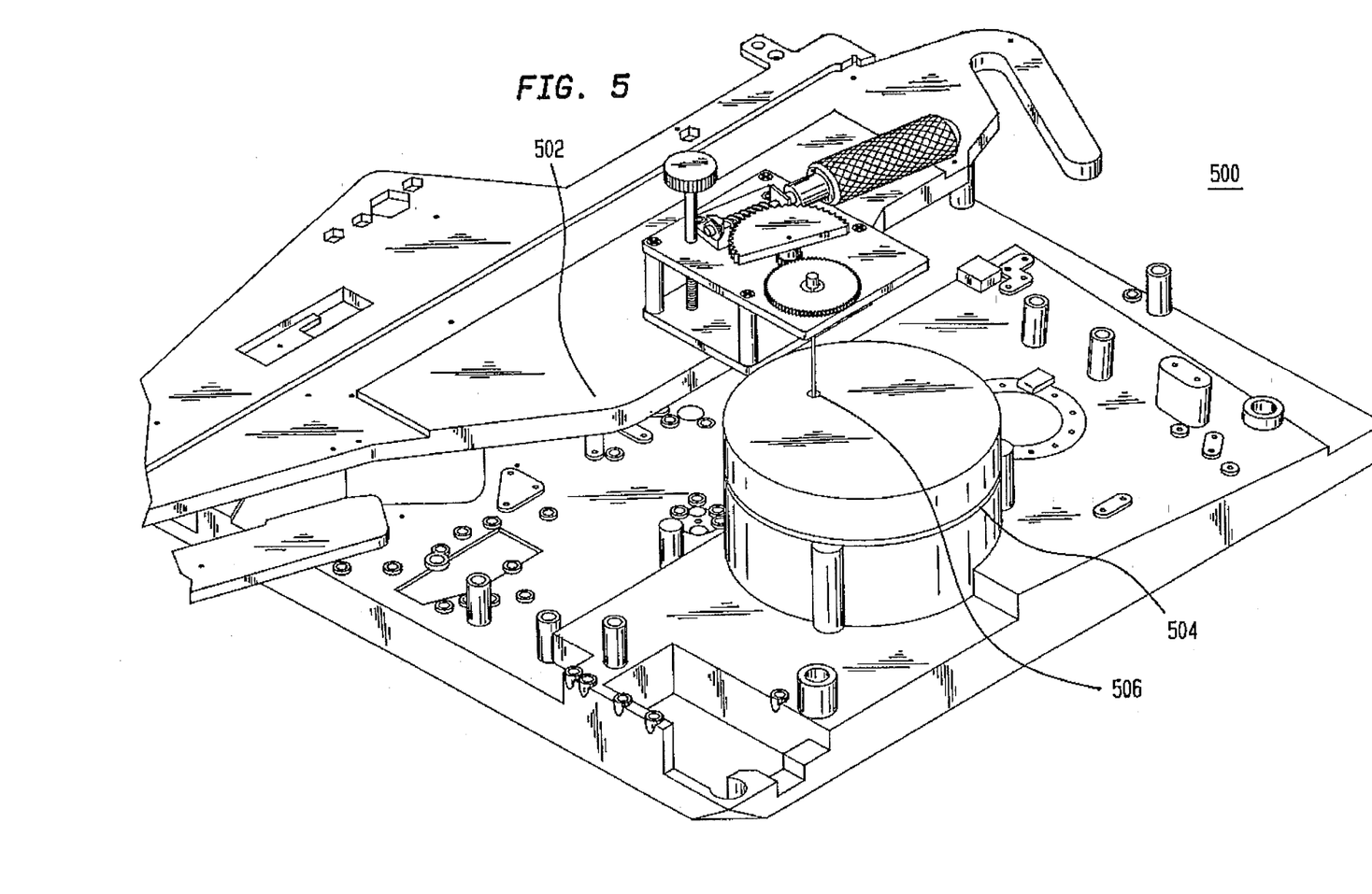
FIG. 5 is a top perspective view of the adjustment apparatus when mounted to a transport above a helical scan device.
Figure 6:
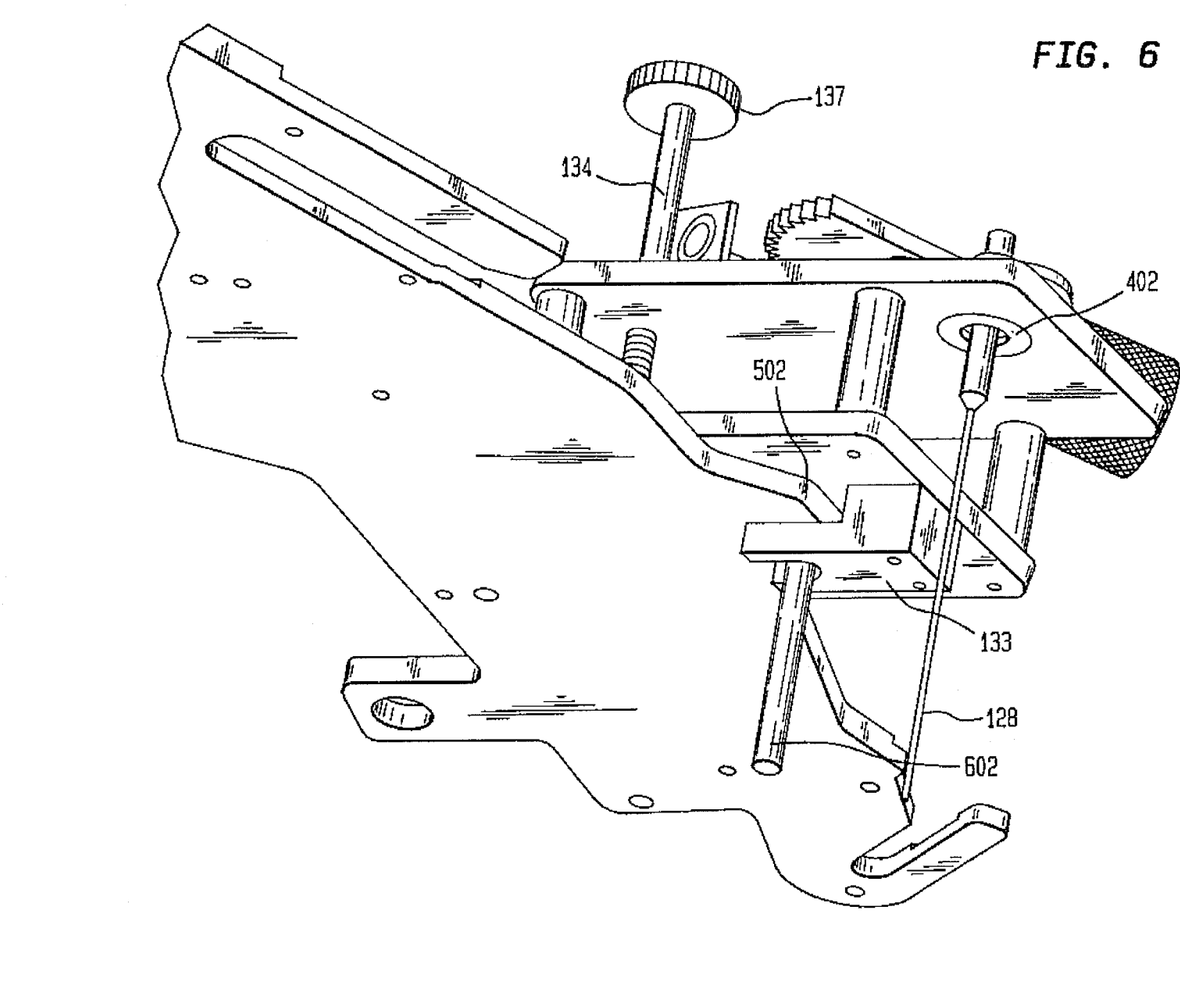
FIG. 6 is a bottom perspective view of the adjustment apparatus when mounted to a transport above a helical scan device.

FIGS. 5 and 6 show a top and bottom perspective view of adjustment apparatus 100 when mounted to helical scan device 500, respectively. Referring now to FIGS. 4–6, mounting bracket 133 includes a U-shaped opening 404 for aligning adjustment apparatus 100 with helical scan device 500. A guide post 602 is fixedly attached to helical scan device 500. Adjustment apparatus 100 is slidably mounted onto a threader cam surface 502 so that u-shaped opening 404 mates with guide post 602. Guide post 602 connects and aligns adjustment apparatus 100 with helical scan device 500 at a chosen location, so that allen wrench 128 can be inserted into and rotate adjustment screw 506 of a helical scan drum 504.

Once adjustment apparatus 100 has been slid onto threader cam surface 502, a fastener 134 is used to secure it to helical scan device 500. In the preferred embodiment, fastener 134 is a screw which passes through base plate 106 and mounting plate 108. Fastener 134 includes a threaded end 136 and a mounting knob 137. In the preferred embodiment, the user turns mounting knob 137 until threaded end 136 abuts a surface of threader cam surface 502. This turning action will force an upper surface of mounting bracket 133 against a lower surface of cam surface 502 to secure adjustment apparatus 100 to helical scan device 500. In another embodiment, adjustment apparatus 100 may be secured to a variety of devices using fastening means known to one skilled in the relevant art.

Figure 7:
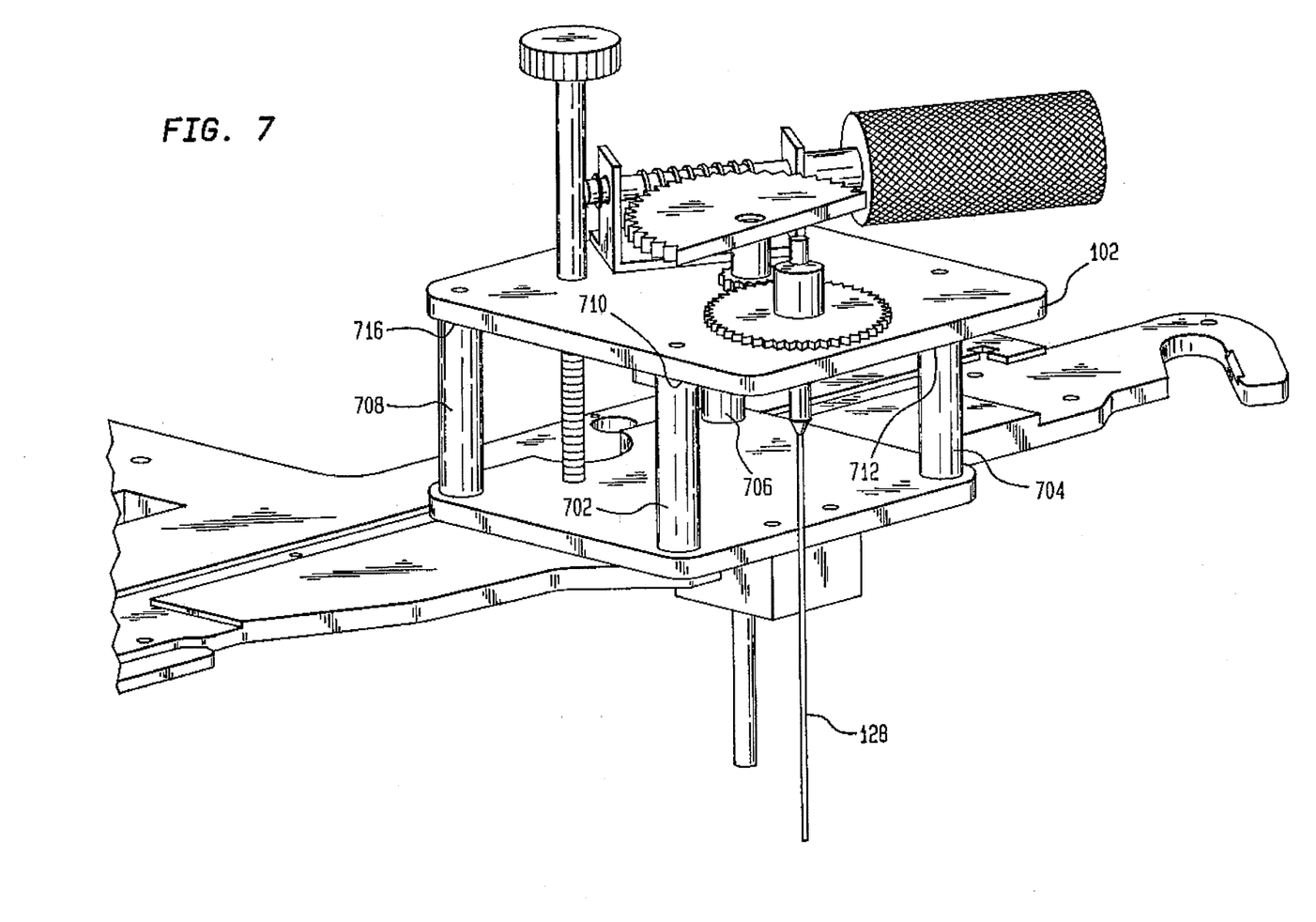
FIG. 7 is a top perspective view of an alternate embodiment of an adjustment apparatus when mounted to a transport above a helical scan device.
Figure 8:
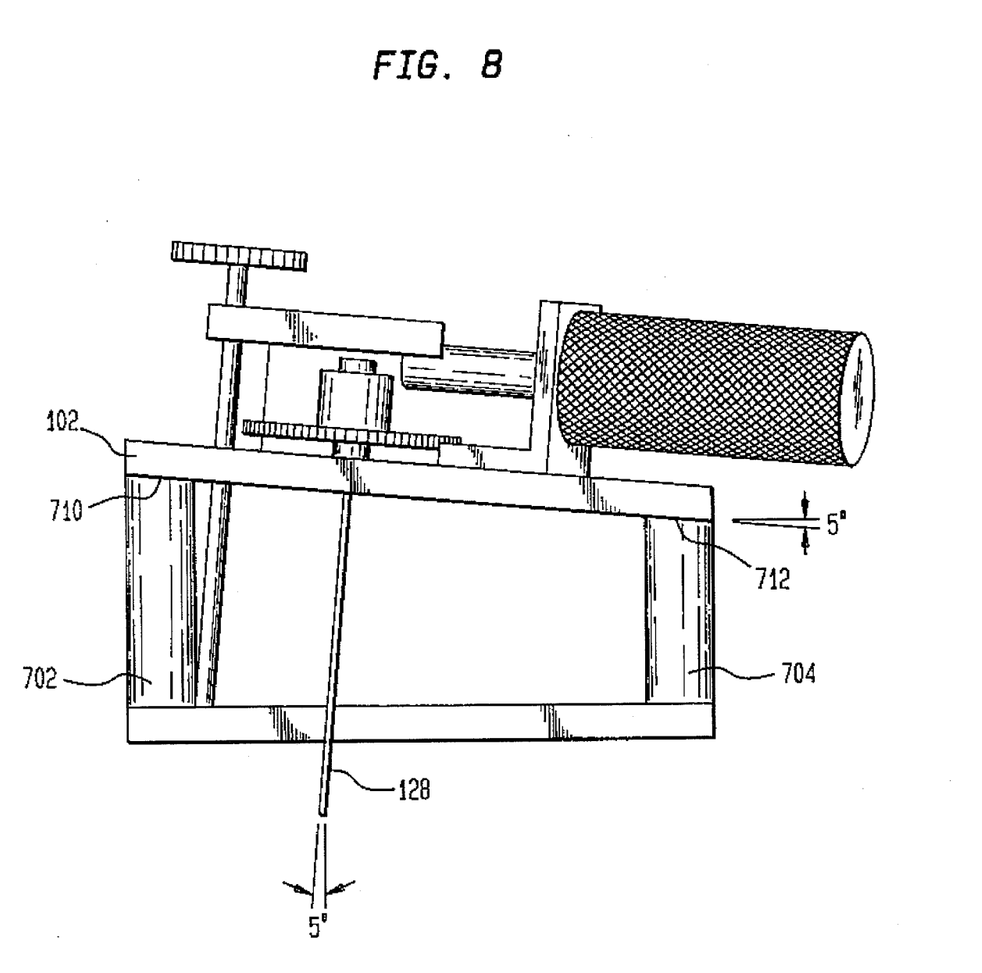
FIG. 8 is a front view of the alternate embodiment shown in FIG. 7.

In the preferred embodiment, the apparatus of the invention is used to adjust head alignment of a helical scanner in the tape transport described in the above-referenced patent and patent application. In that helical scanner, the adjustment screw for head alignment is tilted five degrees from vertical. Thus, for optimal coupling between the adjustment tool and the adjustment screw, the tool should also be tilted from vertical. This is accomplished by a preferred embodiment of the invention as illustrated in FIGS. 7 and 8. In this preferred embodiment, supports 702, 704, 706 and 708 are each cut at a five degree angle on each of their respective tops 710, 712, 714 (not visible in FIG. 7) and 716, and supports 702 and 708 are longer than supports 704 and 706. Thus, when base plate 106 is attached to supports 702, 704, 706 and 708, it is disposed at a five degree angle from the horizontal. Accordingly, allen wrench 128 is also disposed at a five degree angle from the vertical. Thus, when adjustment apparatus 700 is mounted to the threader cam surface of the helical scan device, the resulting angular positioning of allen wrench 128 more efficiently meshes with and turns the adjustment screw.

While the invention has been particularly shown and described with reference to preferred embodiments thereof, it will be understood by those skilled in the art that various changes in form and details may be made therein without departing from the spirit and scope of the invention.

What is claimed is:

1. An apparatus for adjusting head alignment of a helical scan device, comprising:

an adjustment tool for mating with a rotary adjuster of the helical scan device;

a knob;

reduction means coupled between said adjustment tool and said knob, for receiving an angular displacement from said knob and for transmitting a reduced angular displacement to said adjustment tool;

a frame, wherein said reduction means is disposed on said frame, and wherein said frame is configured for mounting on the helical scan device to achieve a fixed relative positioning of said adjustment tool and the rotary adjuster.

2. The apparatus of claim 1, wherein said frame comprises:

a base plate;

a mounting plate; and supports connecting said base plate and said mounting plate.

3. The apparatus of claim 1 wherein said angular displacement is reduced by a ration of 360 to 1.

4. The apparatus of claim 1, wherein said adjustment tool is an allen wrench.

5. The apparatus of claim 2, wherein said reduction means comprises:

a worm fixedly attached to said knob;

a shaft;

a compound gear assembly rotatably mounted on said shaft, wherein said compound gear assembly comprises a half worm gear and a first spur gear coupled together, and wherein said half gear meshes with said worm;

a sleeve fixedly mounted in said base plate; and a second spur gear fixedly mounted on said sleeve and meshing with said first spur gear, wherein said adjustment tool is fixedly disposed within said sleeve.

6. An apparatus for making fine adjustments to a rotary adjuster of a helical scan device, comprising:

an adjustment tool;

interface means for receiving a rotary force, said rotary force displacing said interface means by an angular displacement;

reduction means, coupled between said adjustment tool and said interface means, tier converting said angular displacement from said interface means to a reduced angular displacement and for transmitting said reduced angular displacement to said adjustment tool;

a frame, wherein said reduction means is disposed on said frame, and wherein said frame is configured for mounting on the helical scan device to achieve a fixed relative positioning of said adjustment tool and the rotary adjuster.

7. The apparatus of claim 6, wherein said frame comprises:

a base plate;

a mounting plate; and supports connecting said base plate and said mounting plate.

8. The apparatus of claim 6, wherein said angular displacement is reduced by a ration of 360 to 1.

9. The apparatus of claim 6, wherein said adjustment tool is an allen wrench.

10. The apparatus of claim 6, wherein said interface means is a knob.

11. The apparatus of claim 7, wherein said reduction means comprises:

a worm fixedly attached to said interface means;

a shaft;

a compound gear assembly rotatably mounted on said shaft, wherein said compound gear assembly comprises a half worm gear and a first spur gear coupled together, and wherein said half worm gear meshes with said worm;

a sleeve fixedly mounted in said base plate; and a second spur gear fixedly mounted on said sleeve and meshing with said first spur gear, wherein said adjustment tool is fixedly disposed within said sleeve.

12. An apparatus for adjusting head alignment of a helical scan device, comprising:

an adjustment tool for mating with a rotary adjuster of the helical scan device;

a knob;

reduction means, coupled between said adjustment tool and said knob, for receiving an angular displacement from said knob and for transmitting a reduced angular displacement to said adjustment tool; and a frame, wherein said reduction means is mounted on said frame, and wherein said fame is configured for mounting on the helical scan device to achieve a fixed relative positioning of said adjustment tool and the rotary adjuster, wherein said reduction means includes, a worm fixedly attached to said knob, a shalt, a compound gear assembly rotatably mounted on said shaft, wherein said compound gear assembly comprises a half worm gear and a first spur gear coupled together, and wherein said half worm gear meshes with said worm, a sleeve fixedly mounted in said frame, and a second spur gear fixedly mounted on said sleeve and meshing with said first spur gear, wherein said adjustment tool is fixedly disposed within said sleeve.

\* \* \* \* \*